United States Patent
Khanduja et al.

(10) Patent No.: US 11,281,794 B2
(45) Date of Patent: Mar. 22, 2022

(54) FINE GRAINED ACCESS CONTROL ON PROCEDURAL LANGUAGE FOR DATABASES BASED ON ACCESSED RESOURCES

(71) Applicant: Microsoft Technology Licensing, LLC, Redmond, WA (US)

(72) Inventors: Rakesh Khanduja, Bangalore (IN); Pankaj Sharma, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 216 days.

(21) Appl. No.: 16/678,574

(22) Filed: Nov. 8, 2019

(65) Prior Publication Data

US 2021/0097194 A1    Apr. 1, 2021

(30) Foreign Application Priority Data

Sep. 26, 2019 (IN) .............................. 201941039039

(51) Int. Cl.
| | |
|---|---|
| *G06F 21/62* | (2013.01) |
| *G06F 16/27* | (2019.01) |
| *G06F 21/31* | (2013.01) |
| *G06F 16/23* | (2019.01) |

(52) U.S. Cl.
CPC ...... *G06F 21/6227* (2013.01); *G06F 16/2358* (2019.01); *G06F 16/27* (2019.01); *G06F 21/31* (2013.01)

(58) Field of Classification Search
CPC ...... G06F 21/6227; G06F 16/27; G06F 21/31; G06F 16/2358; G06F 21/62; G06F 21/10; G06F 16/2433; H04W 12/08; H04L 63/10
See application file for complete search history.

(56) References Cited

U.S. PATENT DOCUMENTS

| | | | |
|---|---|---|---|
| 8,777,102 B1* | 7/2014 | Patterson | G07C 9/22 235/380 |
| 9,838,727 B1* | 12/2017 | Chaudhry | H04N 21/6175 |
| 10,255,445 B1* | 4/2019 | Brinskelle | H04L 63/0428 |

(Continued)

OTHER PUBLICATIONS

"International Search Report and Written Opinion Issued in PCT Application No. PCT/US20/038574", dated Sep. 8, 2020, 10 Pages.

*Primary Examiner* — Aravind K Moorthy
(74) *Attorney, Agent, or Firm* — Fiala & Weaver P.L.L.C.

(57) ABSTRACT

Methods, systems, apparatuses, and computer program products are provided for controlling access to a database. A data processing application may receive, from a user, a request that includes a procedural language code block to access data elements stored in a distributed database. A procedural language code block analyzer may obtain an access control policy that indicates permissions to access the data elements. A control system may determine, based on the access control policy, that access to a restricted portion of the data elements is denied. A reconstruction system may generate a reconstructed code block that allows the user to access data elements that are not restricted, such as by modifying the request to remove the portion that seeks access to the restricted data elements. The reconstruction system may then provide the modified request to the distributed database to receive the data elements to which the user is permitted to access.

20 Claims, 9 Drawing Sheets

(56) References Cited

U.S. PATENT DOCUMENTS

| | | | |
|---|---|---|---|
| 10,412,086 B1* | 9/2019 | Lintilhac | G06F 21/6218 |
| 2004/0054933 A1* | 3/2004 | Wong | G06F 21/577 |
| | | | 726/21 |
| 2004/0205342 A1* | 10/2004 | Roegner | G06F 21/6218 |
| | | | 713/168 |
| 2008/0086482 A1* | 4/2008 | Weissman | G06F 21/6218 |
| 2008/0120690 A1* | 5/2008 | Norlander | G06F 21/57 |
| | | | 726/1 |
| 2008/0235231 A1* | 9/2008 | Gass | G06F 21/6227 |
| 2008/0288548 A1* | 11/2008 | Lawler | G06F 21/6227 |
| 2009/0300045 A1* | 12/2009 | Chaudhry | G06F 21/552 |
| 2010/0024014 A1* | 1/2010 | Kailash | H04L 9/3213 |
| | | | 726/6 |
| 2011/0131190 A1* | 6/2011 | Pooley | H04L 63/20 |
| | | | 707/702 |
| 2011/0231769 A1* | 9/2011 | Tovar | H04L 63/20 |
| | | | 715/735 |
| 2012/0124184 A1* | 5/2012 | Sakata | G06F 15/167 |
| | | | 709/220 |
| 2012/0233662 A1* | 9/2012 | Scott-Cowley | H04L 51/32 |
| | | | 726/4 |
| 2013/0066955 A1* | 3/2013 | Neel | H04L 67/42 |
| | | | 709/203 |
| 2013/0246796 A1* | 9/2013 | Lichtenstadt | G06F 21/6227 |
| | | | 713/176 |
| 2013/0275574 A1* | 10/2013 | Hugard, IV | H04L 41/12 |
| | | | 709/224 |
| 2013/0332484 A1* | 12/2013 | Gajic | G06F 16/20 |
| | | | 707/770 |
| 2014/0143826 A1* | 5/2014 | Sharp | H04L 63/102 |
| | | | 726/1 |
| 2014/0250509 A1* | 9/2014 | Ansley | H04W 12/08 |
| | | | 726/6 |
| 2014/0298398 A1* | 10/2014 | Neely | G07C 9/00571 |
| | | | 726/1 |
| 2015/0120781 A1* | 4/2015 | Schreter | G06F 9/5077 |
| | | | 707/792 |
| 2015/0365431 A1* | 12/2015 | Iliev | G06F 21/62 |
| | | | 726/23 |
| 2016/0147850 A1* | 5/2016 | Winkler | G06F 16/258 |
| | | | 707/602 |
| 2016/0191466 A1* | 6/2016 | Pernicha | H04L 63/20 |
| | | | 726/1 |
| 2016/0299946 A1* | 10/2016 | To | G06F 16/217 |
| 2016/0337356 A1* | 11/2016 | Simon | H04L 63/10 |
| 2017/0006066 A1* | 1/2017 | Eckel | H04L 63/20 |
| 2017/0024572 A1* | 1/2017 | Ferraiolo | G06F 16/235 |
| 2017/0127215 A1* | 5/2017 | Khan | H04W 4/021 |
| 2017/0147705 A1* | 5/2017 | Kasperovics | G06F 16/2433 |
| 2017/0250816 A1* | 8/2017 | Popa | G06F 21/12 |
| 2017/0329589 A1* | 11/2017 | Kominar | G06F 8/61 |
| 2017/0366547 A1* | 12/2017 | Goldfarb | H04L 63/102 |
| 2018/0004970 A1* | 1/2018 | Arumugam | G06F 16/182 |
| 2018/0060365 A1* | 3/2018 | Mujumdar | G06F 16/211 |
| 2018/0060603 A1* | 3/2018 | Ahmed | G06F 16/284 |
| 2018/0109498 A1* | 4/2018 | Singh | H04L 67/02 |
| 2018/0124601 A1* | 5/2018 | Vutukuri | H04W 12/08 |
| 2018/0132107 A1* | 5/2018 | Lai | H04W 12/08 |
| 2018/0143764 A1* | 5/2018 | Araki | G06F 3/0685 |
| 2018/0183801 A1* | 6/2018 | Viswanath | G06F 21/6218 |
| 2018/0247072 A1* | 8/2018 | Hind | H04L 63/101 |
| 2018/0288616 A1* | 10/2018 | Knox | G06N 3/0445 |
| 2018/0367552 A1* | 12/2018 | Burriesci | G06F 16/986 |
| 2018/0373757 A1 | 12/2018 | Schukovets et al. | |
| 2019/0042288 A1* | 2/2019 | Hanumantharau | G06F 9/4552 |
| 2019/0140848 A1* | 5/2019 | Dontov | H04L 9/006 |
| 2019/0155794 A1 | 5/2019 | Mujumdar et al. | |
| 2019/0158275 A1* | 5/2019 | Beck | G06F 16/2379 |
| 2019/0158528 A1* | 5/2019 | Xia | G06Q 20/40 |
| 2019/0199796 A1* | 6/2019 | Smith | H04L 67/26 |
| 2019/0238319 A1* | 8/2019 | Beck | H04L 9/3247 |
| 2019/0243987 A1 | 8/2019 | Ahmed et al. | |
| 2019/0253257 A1* | 8/2019 | Yan | H04L 63/102 |
| 2019/0325151 A1* | 10/2019 | Garon | G06F 21/604 |
| 2019/0361897 A1* | 11/2019 | Bernstein | G06F 16/252 |
| 2019/0392061 A1* | 12/2019 | Terry | G06F 16/2379 |
| 2020/0007529 A1* | 1/2020 | Bahrenburg | H04W 12/08 |
| 2020/0042734 A1* | 2/2020 | Lee | G06F 16/2282 |
| 2020/0042837 A1* | 2/2020 | Skinner | G06F 21/62 |
| 2020/0067907 A1* | 2/2020 | Avetisov | H04L 9/0825 |
| 2020/0068400 A1* | 2/2020 | Ramic | H04L 63/102 |
| 2020/0117656 A1* | 4/2020 | Royyuru | G06F 16/2379 |
| 2020/0120138 A1* | 4/2020 | Sanders | G06N 5/003 |
| 2020/0236079 A1* | 7/2020 | Shulman | H04L 63/0236 |
| 2020/0278969 A1* | 9/2020 | Tran | G06F 16/2433 |
| 2020/0279270 A1* | 9/2020 | Lieberman | H04L 9/0897 |
| 2020/0304505 A1* | 9/2020 | Shen | G06F 16/2246 |
| 2020/0313878 A1* | 10/2020 | Wang | G06F 21/6218 |
| 2020/0342245 A1* | 10/2020 | Lubin | G06K 9/0061 |
| 2021/0026831 A1* | 1/2021 | Mishra | H04L 63/20 |
| 2021/0051148 A1* | 2/2021 | Parikh | H04L 67/32 |
| 2021/0073353 A1* | 3/2021 | Kostadinova | H04L 63/1425 |
| 2021/0176125 A1* | 6/2021 | Kyriannis | H04L 63/18 |
| 2021/0182699 A1* | 6/2021 | Koyyalummal | G06F 11/079 |
| 2021/0240854 A1* | 8/2021 | Krafcik | H04L 67/2819 |

\* cited by examiner

```
1. DECLARE
2.      salary_1 float;
3.      social_security_number_1 text;
4.      birthdate_1 date;
5. BEGIN
6.      select payroll.salary into salary_1, emp.social_security_number into
7.      social_security_number_1, emp.birthdate into birthdate_1 from emp inner
8.      join payroll using (employeeid) where employeeid = employeeid_1;
9.          raise notice 'Initial Salary: %', salary_1;
10.         raise notice 'Social Security Number: %', social_security_number_1;
11.         raise notice 'Birthdate: %', birthdate_1;
12.         if salary_1 <= 0 then
13.             salary_1 := 0;
14.         elsif salary_1 < 5000 then
15.             salary_1 := salary_1*(1+0.10);
16.          elsif salary_1 >= 5000 AND salary_1 < 10000 then
17.             salary_1 := salary_1*(1+0.15);
18.         elsif salary_1 >= 10000 AND salary_1 < 20000 then
19.             salary_1 := salary_1*(1+0.20);
20.          else
21.             salary_1 := salary_1*(1+0.25);
22.         end if;
23.         raise notice 'Incremented Salary: %', salary_1;
24.          if salary_1 > 0 then
25.             update payroll set salary=salary_1 where employeeid=empl oyeeid_1;
26.         end if;
27.         return salary_1;
END;
```

FIG. 5

```
1. DECLARE
2. salary_1 float;
3. social_security_number_1 text;
4. birthdate_1 date;
5. BEGIN
6.     select 0 into salary_1, cast('XXXX' as string) into
7.     social_security_number_1, emp.birthdate into birthdate_1 from emp inner
8.     join payroll using (employeeid) where employeeid = employeeid_1;
9.         raise notice 'Initial Salary: %', salary_1;
10.        raise notice 'Social Security Number: %', social_security_number_1;
11.        raise notice 'Birthdate: %', birthdate_1;
12.        if salary_1 <= 0 then
13.            salary_1 := 0;
14.        elsif salary_1 < 5000 then
15.            salary_1 := salary_1*(1+0.10);
16.        elsif salary_1 >= 5000 AND salary_1 < 10000 then
17.            salary_1 := salary_1*(1+0.15);
18.        elsif salary_1 >= 10000 AND salary_1 < 20000 then
19.            salary_1 := salary_1*(1+0.20);
20.        else
21.            salary_1 := salary_1*(1+0.25);
22.        end if;
23.        raise notice 'Incremented Salary: %', salary_1;
24.        if salary_1 > 0 then
25.            update payroll set salary=salary_1 where
26.            employeeid=employeeid_1;
27.        end if;
28.        return salary_1;
29. END;
```

FIG. 6

ACL-DSTC

| Database | Schema | Table | Column | Access Policy |
|---|---|---|---|---|
| Example | Example | Emp | * | Allow read |
| Example | Example | Payroll | Salary | Deny read |
| Example | Example | Payroll | * | Allow update |

P-DSTC after reconstruction

| Database | Schema | Table | Column | Access Policy |
|---|---|---|---|---|
| Example | Example | Emp | * | Allow read |
| Example | Example | Emp | Social_security_number | Masked |
| Example | Example | Payroll | Salary | Deny read |
| example | Example | Payroll | * | Allow update |

FIG. 9

FINE GRAINED ACCESS CONTROL ON PROCEDURAL LANGUAGE FOR DATABASES BASED ON ACCESSED RESOURCES

CROSS-REFERENCE TO RELATED APPLICATIONS

This application claims foreign priority to Indian Patent Application No. 201941039039, filed on Sep. 26, 2019, the entirety of which is incorporated by reference herein.

TECHNICAL FIELD

This application generally relates to databases and the access control rules and policies that define access rights for users and limit the users from accessing data or processing sensitive business logic.

BACKGROUND

Procedural language extensions are available for relational database languages. Such extensions allow users to combine a database language and procedural programming to retrieve and process data stored in database tables. An example of such a procedural language extension is PL/SQL, which is available in Oracle databases. PL/SQL can be written in blocks that contain complex business logic and embedded SQL statements to access data elements. A block without a name is known as an anonymous block. The anonymous block is the simplest unit in PL/SQL. It is called an "anonymous" block because it is not saved in the Oracle database. The embedded SQL statements from the PL/SQL blocks access data elements, such as databases, schemes, and tables that are access controlled using various rules and access control policies. The access control rules and policies define access rights for users and limit the users from accessing data or processing sensitive business logic.

SUMMARY

In general, this specification relates to fine grain access control for procedural code blocks defined to access data from databases. Systems, computer program products and methods implementing access control on a distributed database or file system are described.

Methods, systems, apparatuses, and computer program products are provided for controlling access to a database. A data processing application may receive, from a user, a request to access data elements stored in a distributed database, the request including a procedural language code block (e.g., a PL/SQL code block). A procedural language code block analyzer may obtain an access control policy that indicates permissions to access the data elements. A control system may determine, based on the access control policy, that access to a restricted portion of the data elements is denied. A reconstruction system may generate a reconstructed code block that allows the user to access data elements that are not restricted. For instance, the reconstruction system may modify the request provided by the user by reconstructing the PLCB to remove a request that seeks access to the restricted portions. The reconstruction system may then provide the modified request to the distributed database to receive a second portion of data elements to which the user is permitted to access.

In general, one innovative aspect of the subject matter described in this specification can be embodied in methods that include enforcing access control at the distributed computing level of a distributed computing system within a procedural language extension block or prior to the block being executed. An example of such a procedural language extension for SQL is PL/SQL, which is available in Oracle databases. Other examples of procedural language extensions for SQL include SQL/PSM, PSQL, and ABAP, as well as Perl, Python for PostgreSQL.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware or a combination of them in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular one embodiment includes all the following features in combination.

The example data access system improves data security by ensuring fine-grained security rules and policies when provisioning data through PL/SQL procedures. The benefits of using stored procedures rather than application code stored locally on client computers include allowing for modular programming, faster execution, reduce network traffic, and can be used as a security mechanism.

The data access system of this specification improves data security by intercepting PL/SQL code blocks prior to the code blocks accessing data and ensuring that the rules and policies of the policy engine are enforced when data is accessed from a database.

The details of one ore embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

FIG. 5 is an example procedural code block.

FIG. 6 is an example procedural code block after reconstruction of PL/SQL code block.

FIG. 7 is an example user data access elements.

FIG. 9 is an example user data access elements after reconstruction.

Like reference numbers and designations in the various drawings indicate like elements.

DETAILED DESCRIPTION

I. Example Implementations

As noted above, procedural language extensions are available for relational database languages. A problem is that access control for procedural language blocks is binary. In other words, if the user does not have permission to access at least one database element required by the procedural language block, the procedural language block does not execute, causing an entire query (to the database) to fail. By reconstructing (or modifying) the procedural language blocks, the reconstructed procedural language block can be executed to provide an at least partially responsive answer to the query, without accessing the restricted database elements.

Figure 1:
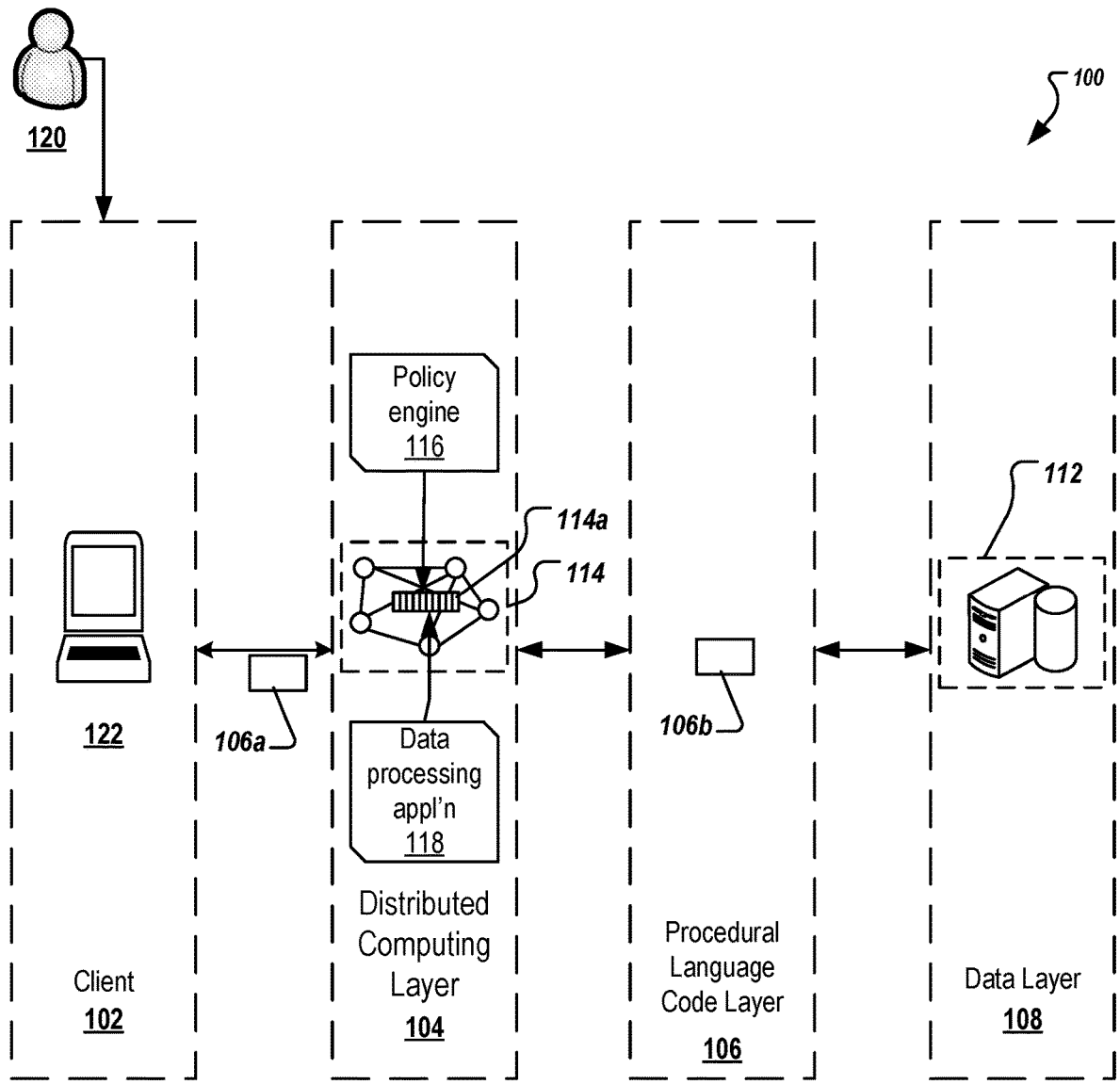
FIG. 1 is a block diagram illustrating an example distributed computing system.

FIG. 1 is a block diagram illustrating an example distributed computing system 100. As illustrated, the system 100 includes a client layer 102 (including client devices 122), a distributed computing layer 104 (including a distributed execution framework 114, a policy engine 116, and a data processing application 118), a procedural language code block layer 106 and a data layer 108 (including a distributed database or distributed file system 112).

The client layer 102 can include one or more client devices 122 that are used by one or more users 120. The client devices 122 run software that can request a process be performed by a data processing application 118 executing in the distributed computing layer 104 (e.g., in the distributed execution framework 114). The distributed computing layer 104 is connected to one or more distributed databases or file systems 112 in the data layer 108 to retrieve data for the data processing application 118.

A data processing application 118 can receive a data access request from a user 120. The data access request may be received in the form of a procedural language code block 106a, e.g., PL/SQL.

Prior to executing the procedural language code block 106a, a data access system 114a reads the data access request of the procedural language code block 106a to determine which data elements, e.g., databases, schemas, tables, and columns, that the procedural language code block 106a will access. The data access system 114a then retrieves, from a policy engine 116, one or more access control policies for the user 120 that correspond to those data elements, e.g., databases, schemas, tables and columns. The data access system 114a can be embedded in the distributed execution framework 114. In general, the data access system 114a sends to the policy engine 116 a call that includes a user identification and an identification of the data elements, and receives back access control policies for the individual user and/or for the data element. The policy engine 116 can be embedded in the distributed execution framework 114.

If the access control policy settings for the user does not align with the procedural language code block 106a, the user 120 does not have permission to access one or more of the data elements requested by the procedural language code block 106a. In such situation, while the distributed execution framework 114 could deny permission to execute the procedural language code block 106a, this is not ideal because the user may still have permission to access other requested data elements in the procedural language code block 106a that are not restricted by the access control policy. A solution, which is discussed in this disclosure, is to restructure the procedural language code block 106a to comply with the access control policy settings for the user 120 and permit execution of the restructured code block.

In particular, the data access system 114a can modify the data access request to conform to the retrieved access control policy for the particular user 120. In particular, the data access system 114a can modify the procedural language code block 106a to generate a reconstructed procedural language code block 106b that requests only data elements that are permitted by the access control policy settings for the user 120. The reconstructed procedural language block 106b is then executed (for example by the distributed execution framework 114) to obtain the permitted data elements from the distributed file system 112. The distributed execution framework 114 then provides the obtained data to the data processing application 118, which provides the data to the client device 122 or to an account of the user 120.

The data processing application 118 includes a data access method. The data access method of the data processing application may call the data access method performed by the procedural language code layer 106 using a direct application programming interface method. The data access method of the procedural language code layer 106 may override the data access method of the data processing application 118 so the data access method of the data processing application implicitly calls the data access method of the procedural language code layer 106.

A second data access request may be received from a second data processing application executing in the distributed computing layer 104. The second data access request may be associated with a second user. The second data access request may be directed to a security application executing in the distributed execution framework 114 to obtain data access.

Figure 2:
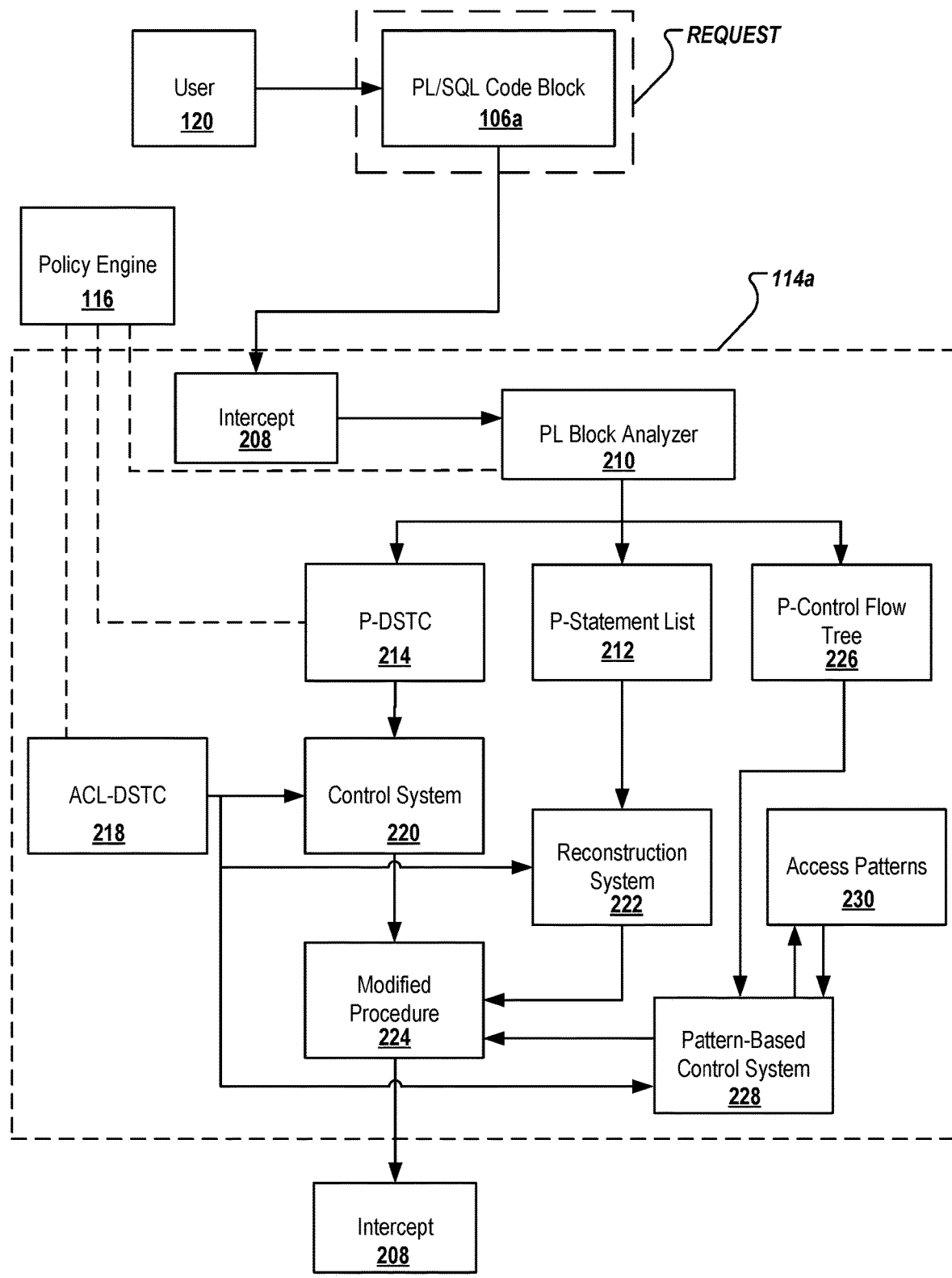
FIG. 2 depicts an example architecture for access control of the procedural code block.

FIG. 2 depicts an example architecture for access control for a procedural language code block 106a. For example, the data access system 114a determines access permissions for a procedural language code block by comparing the data elements requested by the procedural language code block 106a and user permission for the user that submitted the procedural language code block 106a. If necessary, the data access system 114a then restructures the procedural code block to conform to the access control permissions. For example, if the requested data elements do not match the permitted data element for the user, the data access system 114a reconstructs the procedural code block to remove a portion of the procedural language code block 106a that requests access to the restricted data elements.

A user 120 can submit a procedural language code block 106a through a client device 122 and as part of a data access request. FIG. 5 illustrates an example procedural code block 106a. This example procedural language code block provides an example for requesting an update on an employee's salary. Naturally code blocks could be used to perform many other functions.

The user's request, which may include the procedural language code block 106a, is intercepted by an intercept module 208 in the data access system 114a. The intercept module may be configured to intercept the request submitted by the user over a communication chancel that communicatively couples the client 102 and the distributed computing layer 104, such as a network. In implementations, the intercept module 208 may also intercept identification information of the user 120 submitting the request that includes the procedural language code block 106a. The intercept module 208 identifies which portion of the request is a procedural language code block 106a. The intercept module 208 then outputs the identified procedural language code block 106a to a procedural language (PL) block analyzer 210.

The PL code block analyzer 210 generates or restores a PL code block description 214 (a "P-DSTC") that includes a data element list 214a of data elements, e.g., databases, schemas, tables and columns ("DSTC") is specified in the procedural language code block 106a. The PL code block analyzer 210 may be configured to extract the data element list 214a of data elements in various ways. In one implementation, the PL code block analyzer 210 may be configured to perform a lexical analysis on the procedural language code block 106a to tokenize the code blocks contained therein to generate one or more tokens (e.g., strings). Based on the generated tokens, the PL code block analyzer 210 may tag the DSTC elements, such as by using pre-defined metadata for pre-stored procedures or elements discovered by the PL code block analyzer 210. In another implementation, the PL code block analyzer may search for keywords in the procedural language code block 106a to identify certain terms or operators (e.g., DECLARE, SELECT, JOIN, etc.), and tag the DSTC elements that may follow such terms or operators.

Figure 8:
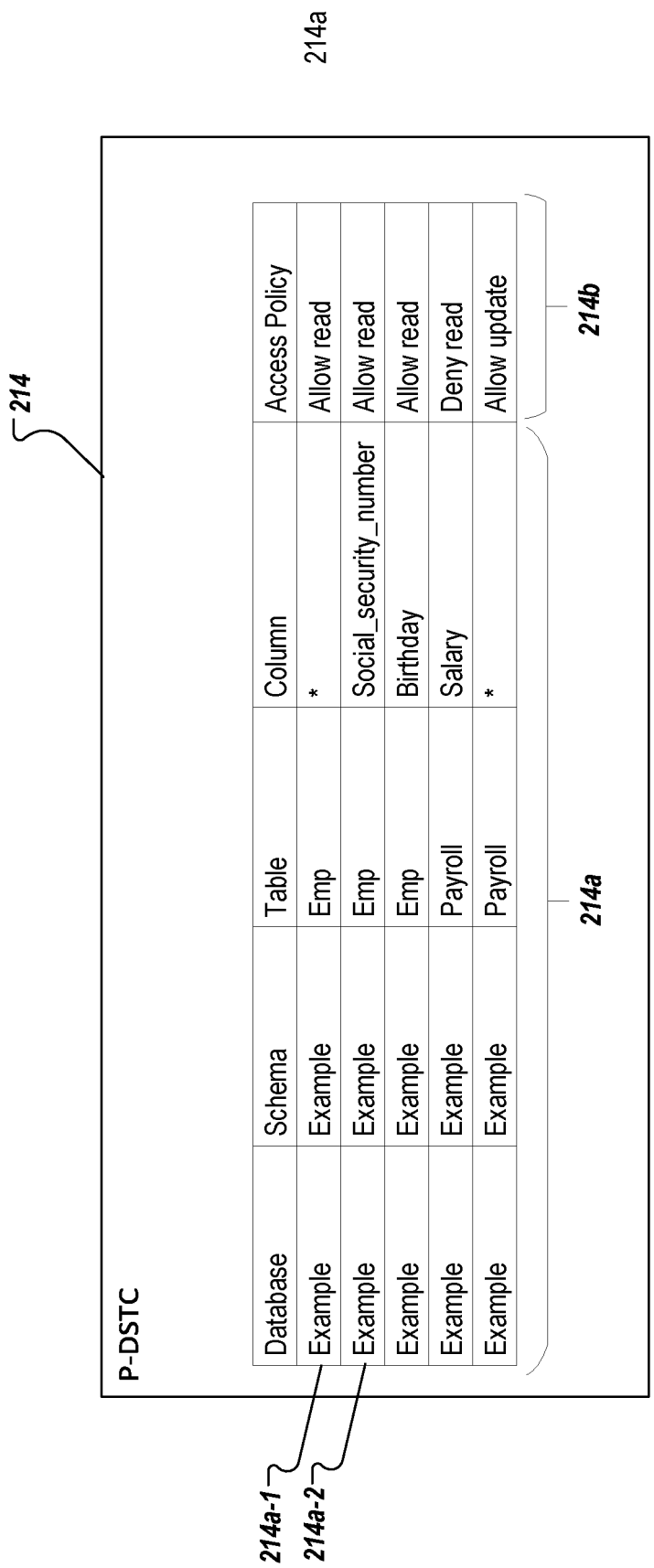
FIG. 8 is an example procedural data access elements.

An example of a P-DSTC 214 is shown in FIG. 8. In the example, the list 214a in the P-DSTC 214 includes a plurality of rows, with each row indicating a data element that the procedural language code block 106a requests accessing. For example, row 214a-1 indicates that the procedural language code block 106a includes a data access request for the Emp table in the Example schema of the Example database, and row 214a-2 indicates that the procedural language code block 106a includes a data access request for the social security number column in the Emp table in the Example schema of the Example database.

In addition, the P-DSTC 214 can include a permissions list 214b that specifies read, write and execute permissions for the data elements in the list 214a that are applicable to all users. The permissions list 214b can be part of the same table as the data element list 214a, e.g., each row in the table can include a field to list permissions for the associated data element.

The PL block analyzer 210 uses the policy engine 116 to generate or restore the permissions list 214b of the P-DSTC 214. To generate the P-DSCT 214, the block analyzer 210 can make a call to the policy engine 116 that includes identifiers for the data elements in the list 214a. The policy engine 116 searches its policies and returns to the PL block analyzer 210 a policy associated with the requested data. The policy can include an execution permission associated with the data for all users (e.g., all standard users). The PL block analyzer 210 enters the received policy into the P-DSTC 214 to provide the permissions list 214b for all users.

If a P-DSTC 214 was previously generated and stored for the data elements specified in the procedural language code block 106a, then the PL block analyzer 210 can restore the stored P-DSTC instead of generating a new P-DSTC. This can be determined by the data access system 114a by cross-referencing the procedure's name to a database of stored P-DSTCs 214. For example, a previously submitted procedural language code block may have a procedure name that matches the procedure name of the current procedural language code block 106a.

If a P-DSTC 214 for the procedural language code block 116a does not exist in the list of P-DSTCs, the block analyzer generates the P-DSTC 214 as described above. Even if a P-DSTC 214 for the submitted procedural language code block 106a exists in the database, the P-DSTC 214 may be updated. For example, the P-DSTC may be updated based on an update in a policy associated with one or more data elements specified in the procedural language code block 116a. In some implementations, if the procedure is an anonymous procedure, the procedure is not added to the database.

The PL block analyzer 210 also generates a P-statement list 212 (also called "P-List" herein). The code block analyzer 210 derives P-statement list 212, e.g., SQL, from the procedural language code block 106. The P-List 212 are the SQL database statements in the procedural code block 106 for accessing the database. Deriving and storing the P-List 212 are described in further detail in FIG. 3. At run time, the PL block analyzer 210 generates an access control description 218 (a "ACL-DSTC") that includes a data element list 218a of data elements, e.g., databases, schemas, tables and columns, requested by the procedural language code block 106a and a user permissions list 218b for the particular user that made the data request. The ACL-DSTC 218 can have a similar format as the P-DSTC 214, and can be similarly guided in generation by the policy engine 116. In particular, the PL block analyzer 210 can make a call to the policy engine 116 that includes identifiers for the data elements in the list 214a and an indication that the call is for a particular user, e.g., by submitting identification information of the user (e.g., the user employee ID) submitting the PL/SQL code block 106a to the policy engine. In response, the PL block analyzer 210 receives user-specific permissions from the policy engine 116, and these user-specific permissions can then be entered into the ACL-DSTC 214 to provide the user-specific permissions list 218b. Generating and storing the ACL-DSTC 218 is described in further detail with respect to FIG. 7.

The P-DSTC provides a list of general access permissions to the data elements specified in the procedural language code block 106a for all users (or all standard users who have no particular privileges). The control system 220 receives the P-DSTC 214 as an input to determine if the user 120, as a standard user, has sufficient permissions to execute the current procedural code block 106. For example, the example procedure bock depicted in FIG. 5 requests accessing the payroll table's salary column. If the P-DSTC 214 indicates that a standard user does not have permission to read the payroll table's salary column, the control system 220 denies execution of the current procedural code block by the user 120.

If user access based on P-DSTC is denied, the control system 220 checks whether the user could receive access to at least a portion of the requested data elements based on a reconstructed procedural code block. For example, the control system 220 can receive the ACL-DSTC 218 and P-DSTC 214 as input to determine if the user 120 has sufficient permissions to execute a previously stored procedural code block (pre-PLCB), e.g., a reconstructed procedural code block pre-106b for an anonymous user. The control system 220 determines such permissions by running a matching algorithm to the ACL-DSTC 218 and the P-DSTC 214, e.g., as shown by FIGS. 7 and 8, at runtime. The output representation is implementation specific. For example, determining if the user has permission to execute the code block can be binary, e.g., 1 to represent access allowed and the system may execute the code block or 0 to represent access denied and an exception can be thrown. If the P-DSTC 214 and ACL-DSTC 218 have matching policies, the previously stored procedural code block pre-106b is executed (e.g., the original procedural language code block may be replaced with the pre-PLCB). This previously stored procedural code block pre-106b can be generated by running the reconstruction procedure discussed below using the ACL-DSTC 218.

However, if the P-DSTC 214 and ACL-DSTC 218 do not have matching policies (e.g., when the P-DSTC 214 and ACL-DSTC 218 have a partially matching data element lists

214*a* and 218*a*, but no matching policies 214*b* and 218*b*), no previously stored procedural code block pre-106*b* can be executed. This is because such a mismatch indicates that the user 120 has fewer permissions than an anonymous user to access the database, table, or schemas in order to execute a previously stored procedural code block pre-106*b*.

If the control system 220 determines that the user 120 does not have permissions to execute the current procedural code block as a standard user or to execute a previously stored procedural code block, the reconstruction system 222 receives the P-DSTC 214 and SQL statements from P-statement list 212 as input and generates a modified or reconstructed procedural code block referred to as a modified procedure 224. How the procedural code block 106 is reconstructed in described in further detail in FIG. 3.

The PL block analyzer 210 also generates a P-control flow tree 226. The P-control flow tree 226 may be configured to generate a control flow of the PL/SQL code block 106*a*. In some examples, policy engine 116 may include control flow pattern-based access policies, which may define access policies based on access patterns. If the control flow violates one or more control flow pattern-based policies in the policy engine 116, the PL/SQL code block 106 may be rejected. As an illustration, if the PL/SQL code block 106*a* includes a procedure to select data from a table containing employee information, and storing the data in a temporary table, even if access to the employee table is permitted by the user submitting the PL/SQL code block 106*a*, there remains a risk that the temporary table in which may store the sensitive data may be accessible by other users who do not have access to the employee table. In such cases, therefore, the P-control flow tree 226 may reject the PL/SQL code block 106*a* based on control flow pattern access policies. If the control flow is rejected, the P-control flow tree may be provided to the pattern-based control system 228 to determine whether the PL/SQL code block 106*a* should be modified based at least on access patterns.

Pattern-based control system 228 may identify and/or generate access patterns 230 relating to the elements in previous PL/SQL code blocks and/or stored procedures, their control flow, and dependencies. For instance, the access patterns 230 may indicate that certain access elements that are present in the PL/SQL code block 106*a* may be used for purposes of computation, analysis, or other decision making in a control flow, but the underlying data (e.g., sensitive information such as individual payroll information) may not be copied or stored in other tables or otherwise returned to the user. In other words, pattern-based control system 228 may be configured to determine a secure manner of access based at least on the user's individual access permissions and/or control flow pattern-based access patterns. As a result, data leaking issues may be minimized by modifying or reconstructing the PL/SQL code block 106*a* to remove the portion of the PL/SQL code block 106 that violates a control flow pattern-based access policy. In some implementations, the pattern-based control system 228 may also identify or learn new patterns of access based on the PL/SQL code block 106*a*, and store those new patterns in the access patterns 230. In some further implementations, a history of accessed data elements based on PL/SQL code blocks (e.g., a reconstructed procedure) and/or stored procedures previously defined may be stored in a log by data access system 114*a*. The log may identify, for instance, the identity of the user accessing the data elements, identity of the data elements that a user accessed and/or was permitted to access, the time of access, and/or the type of access (e.g., read, write, etc.). In some other implementations, the log may also identify attempted accesses, such as an attempted access of a data element in an original PL/SQL code block that was reconstructed as described herein. The log of historical accesses may be available to certain uses, such as administrators, to identify any vulnerabilities and/or access control issues that may exist, enabling the generation or modification of the access control policies in the policy engine 116 and/or the access patterns 230.

Figure 3:
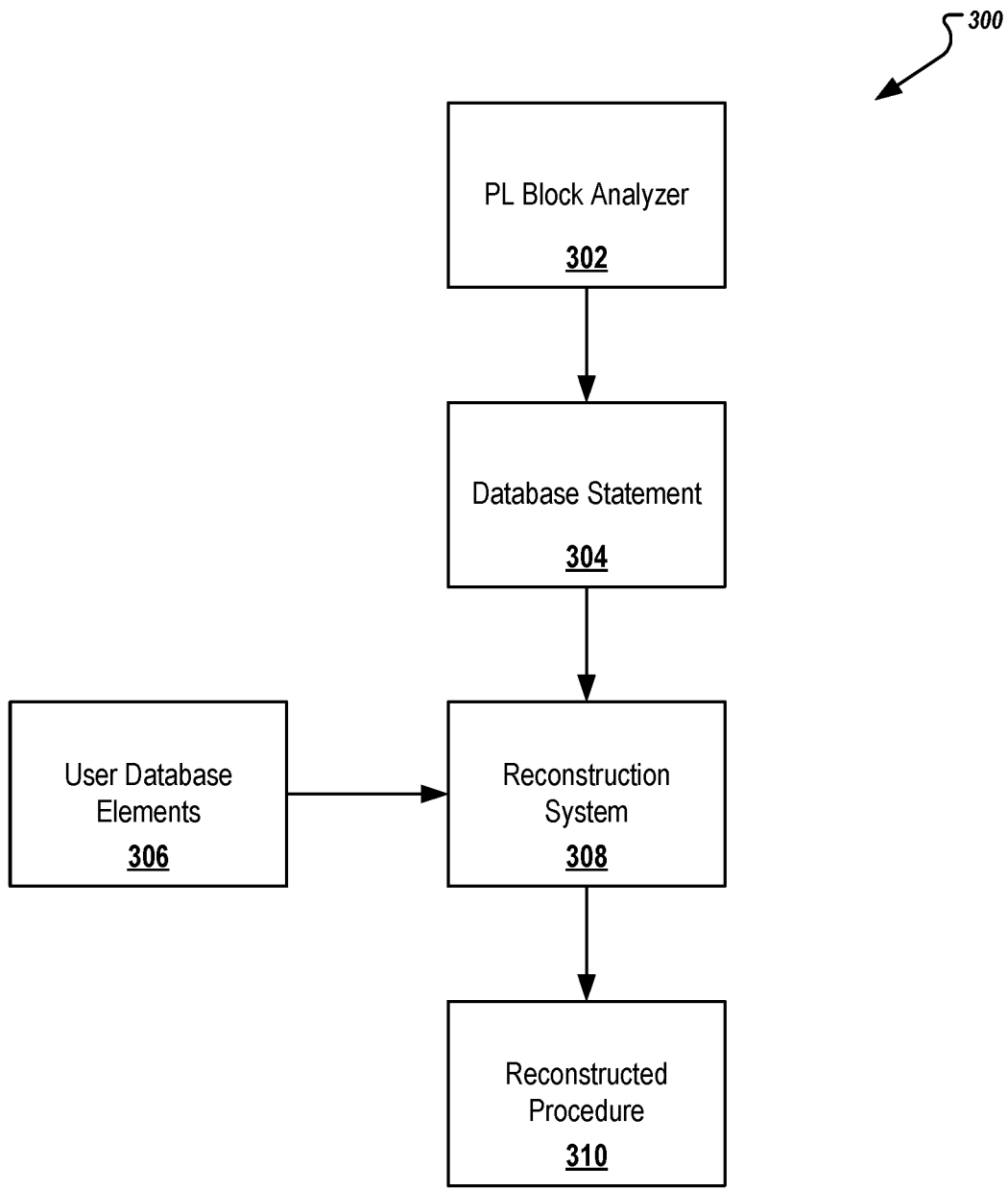
FIG. 3 depicts the architecture for reconstructing the access control of the procedural code block.

FIG. 3 depicts the architecture for reconstructing the access control of the example procedural code block of FIG. 5, to access the employee's salary.

Referring to FIG. 3, the PL block analyzer 302 generates database statements 304, e.g., SQL statements, from the procedural code block 106. The code block analyzer 302 stores the database statements 304 in-memory.

The reconstruction system 308 receives database statements 304 and user database elements 306, i.e., the ACL-DSTC, of the user executing the procedural code block as input. The reconstruction system 308 identifies the elements, e.g., database, tables, schemas or columns, of the database statements 304 the user does not have access to. The reconstruction system 308 can do this by examining the permissions in the ACL-DSTC. The reconstruction system 308 reconstructs the database statements 304 and generates the modified or reconstructed procedural code block referred to as the reconstructed procedure 310 at run-time such that the database statements 304 and the reconstructed procedure 310 are syntactically compliant with the user access control policies represented by the user database elements 306.

The reconstruction system 308 can rewrite the database statements 304 using a variety of methods. For example, in a particular embodiment, if the user database elements 306 specify that the user does not have execute permissions to a first portion of database elements, a second portion of the database elements may be executed. In another embodiment, if the user database elements 306 specify that the user does not have read permissions to a particular column, the reconstruction system 304 can rewrite the elements in the database statements 304 to include a pre-initialized variable instead of reading directly from the column. For example, if a user cannot read the salary column, the reconstruction system 304 rewrites the database statements 304 to include a salary variable that is pre-initialized to zero instead of reading a salary amount from the salary column. Then the reconstruction system 308 generates a reconstructed procedure 310 from the reconstructed database statements 204 that removes the request to access the data elements for which the user does not have permissions to access and the reconstruction system 308 may thereafter provide the reconstructed procedure to the distributed database to receive data elements to which the user is permitted to access (e.g., as defined by the modified procedure). An example reconstructed procedural code block that includes a pre-initialized variable is described in further detail in FIG. 6.

The reconstruction system 308 can generate a modified or reconstructed procedure 310 from the database statements 304 in a variety of methods. For example, in a particular embodiment, the reconstructed procedural code block can point to the database statements. Therefore, when the procedural code block is executed, the procedural code block implicitly calls the database statements 304. In another embodiment, a copy of the original procedural code block can be created with the database statements 304 or the original procedure can be modified to include the database statements 304. The reconstructed procedure 310 is stored.

In some implementations, the reconstruction system 308 may generate the reconstructed procedure 310 in other ways, including but not limited to modifying semantics of the original procedural code block, or portions thereof. For instance, the reconstruction system 308 may modify the original procedural code block to add or remove logic based on the user database elements 306. As an illustration, the PL block analyzer may determine an execution context of the original procedural code block as a computation to aggregate value (e.g., an aggregate salary) across a plurality of employees. Based at least on the execution context, the reconstruction system 308 may implement one or more filters or other logic in the procedural code block to carry out the execution.

Figure 4:
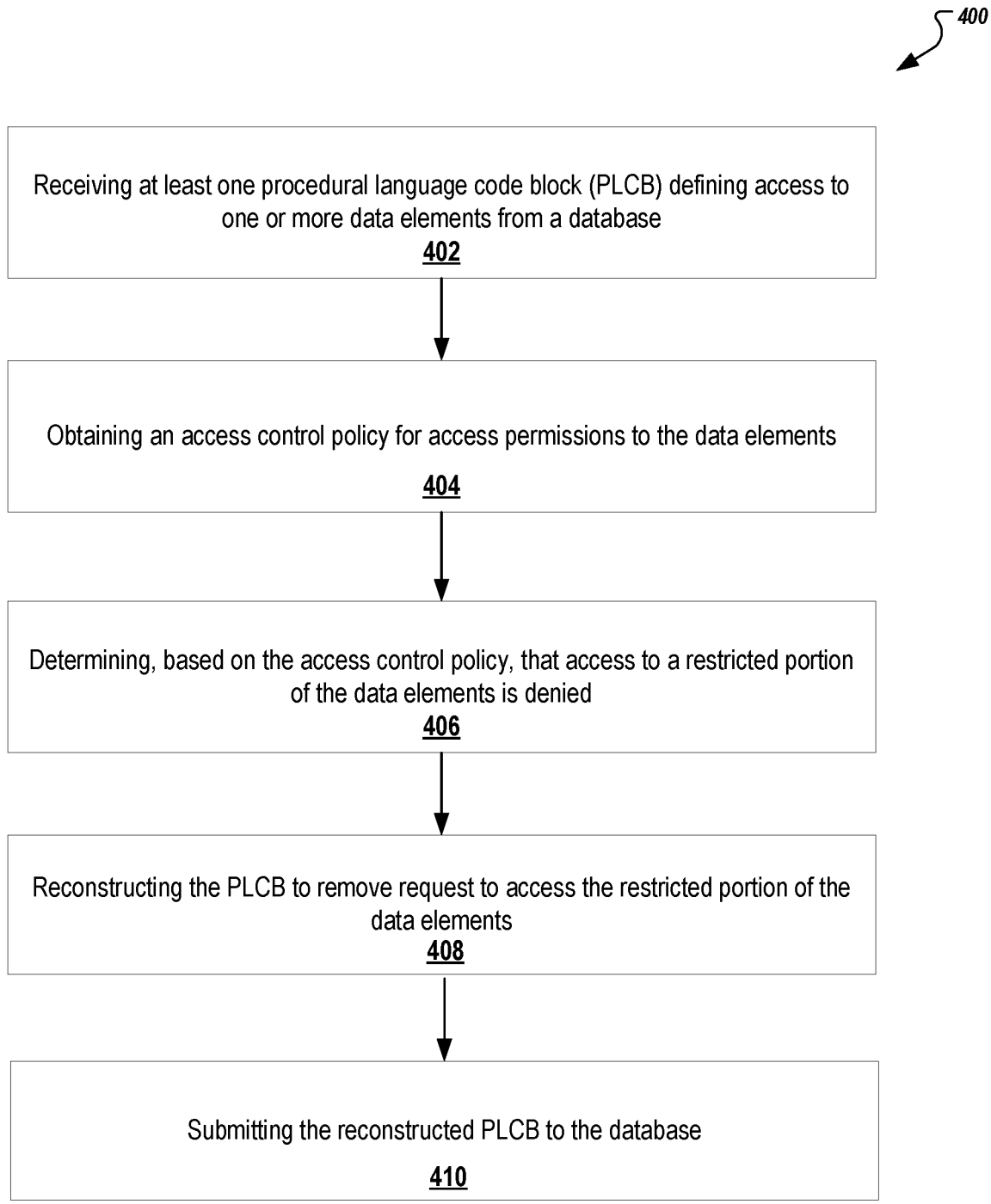
FIG. 4 is a flow chart to determine data access based on the access control policy.

FIG. 4 is a flow diagram of determining data access based on the access control policy. For convenience, the process 400 will be described as being performed by a system of one or more computers located in one or more locations. For example, a distributed computing layer, e.g., the distributed computing layer 104 of FIG. 1, appropriately programmed in accordance with this specification, can perform the process 400.

The PL block analyzer as shown in FIG. 2, receives at least one procedural language code block (PLCB) requesting access to one or more data elements from a database (Step 402). The code block analyzer may receive a procedural language code block as part of a request submitted by a user (or a client device) to a database (e.g., a distributed database). An example of a procedural code block to update the salary of an employee is shown in FIG. 5.

The PL block analyzer as shown in FIG. 2 can identify database elements to which the procedural code block requests access. The PL block analyzer derives a P-DSTC. The P-DSTC specifies the database, schemas, tables and columns accessed by the procedural language code block. An example P-DSTC to update the salary of an employee is shown in FIG. 8. The example P-DSTC specifies the example procedural code block has access to every column of employee and payroll table but is denied read access to the payroll's table salary column.

The computer system shown in FIG. 2 determines an access control policy for the user to the database elements, for example, at runtime of the procedural language code block (Step 404). The example P-DSTC specifies the user may read every column of the employee table and update every column of the payroll table. The user is denied read access to the salary column of the payroll table.

The computer system determines whether the access control policy restricts user access to a restricted portion of the requested data elements (Step 406). For example, the control system executes a matching algorithm to check if the user has permission to access the database elements requested by the procedural code block. If the control system determines the user does not have sufficient access, the reconstruction system reconstructs the procedural code block as specified by FIG. 3. The reconstructed procedural code block generates a modified procedural code block that does not request access to database elements to which the user does not have permission for access as defined by the access control policy (Step 408). The computer system submits the reconstructed procedural code block to the database to receive data elements to which the user has permission to access (Step 410).

For example, the control system would determine that the user does not have sufficient permission to access the database elements accessed by the example procedural language code block to update the salary of an employee. Specifically, the P-DSTC of the user shown in FIG. 8 does not have read permission to the salary column of the payroll table. Therefore, the reconstruction system creates a reconstructed database elements and procedural code block at run-time that is compliant with the access control policy of the user. The example reconstructed procedural code block is described in FIG. 6. As described in FIG. 4, the reconstruction system inserts a pre-initialized salary variable in the database statements instead of for reading from the salary column. This adheres to the user's access control policy, which denies read access to the salary column of the payroll table.

FIG. 5 is an example procedural code block. FIG. 5 is a procedural code block to update an employee's salary. The PL/SQL block declares a salary, social security and birthdate variable as a float, text and date data type respectively (Lines 2-4). The procedure extracts the salary from the payroll table, social security number from the employee table, and birthdate from the employee table of an employee. These values are stored to the salary, social security number and birthdate variable respectively (Lines 6-8). The procedure prints the initial value of the salary, social security number and birthday of the employee (Lines 9-11). The procedure checks the value of the salary of the employee and updates the value of the salary accordingly. If the value of the salary is less than zero, the value of the salary is set to zero. If the value of the salary of an employee is less than 5000, between 5000 and 10000, between 10000 and 20000, or greater, the salary is incremented by 10, 15, 20 and 25 percent of the initial value of the salary respectively (Lines 12-22). The procedure updates the value of the salary in the payroll table for the selected employee with the calculated salary update and returns the updated salary value (Lines 24-27).

The procedural code block shown in FIG. 5 is used to derive the table shown in FIG. 8 which specifies read, write and execute permissions of the procedural code block to the database elements, e.g., database, schema, table, and column (P-DSTC). The specific method to derive the P-DSTC from procedural code block is described in more detail in FIG. 8.

FIG. 6 is an example reconstructed procedural code block. FIG. 6 is an example reconstructed procedural code to update an employee's salary. The reconstructed procedural code block declares a salary, social security and birthdate variable as a float, text and date data type respectively (Lines 2-4). The procedure stores the salary, social security number and birthdate of an employee. Unlike the example procedural code block in FIG. 5, the reconstructed procedural code block does not access the salary column of the payroll table and initializes the salary variable to zero. Furthermore, the social security number variable is cast as a string. The value of the birthdate are extracted from the Payroll and Emp table by specifying a common employee_id between the tables (Lines 6-8). The reconstructed procedural code block prints the initial values of the salary, social security number and birthday of the employee (Lines 9-11). The procedure checks the value of the salary range and updates the value of the salary accordingly. If the value of the salary is less than zero, the value of the salary is set to zero. If the value of the salary of an employee is less than 5000, between 5000 and 10000, between 10000 and 20000, or greater, the salary is incremented by 10, 15, 20 and 25 percent of the initial value of the salary respectively (Lines 12-22). The procedure updates the value of the salary in the payroll table for the selected employee with the calculated salary update and returns the updated salary value (Lines 24-27).

The reconstructed procedural code block shown in FIG. 6 is used to derive the reconstructed table shown FIG. 9 which specifies read, write and execute permissions to the database, schema, table and column for the example reconstructed procedural code block. Procedural data access elements for the example reconstructed procedural code block are described in further detail in FIG. 9.

FIG. 7 is an example user data access elements. ACL-DSTC specifies read, write and execute permissions of an anonymous user for database elements, e.g., database, schema, table and column (DSTC). For example, the anonymous user requesting to execute the example procedural code block of FIG. 5, may read from the Emp table, update the Payroll table but cannot read the Salary column of the Payroll table. The ACL-DSTC can be stored as a flattened data structure. The ACL-DSTC of a user can be predetermined or determined during execution time of the procedural code block. The access control policies for a user can be determined in a variety of methods. For example, in one embodiment, users may belong to one or more groups and each group may specify one or more users. A group may have special permissions for users in order to execute jobs or roles. So the permission of the user could be set the permission of the group by default. If a user belongs to one or more groups, the permissions of a user may be assigned as most or least privilege. In another embodiment, the access control policy of the user may be updated incrementally based on the procedures the user wishes to execute. For example, if the user does not have permission to access any of the database tables, but the procedure the user is executing must access two of the tables, the ACL-DSTC for the user may be updated to allow the user access to the two tables accessed by the procedural code block.

FIG. 8 is an example procedural data access elements. The code block analyzer generates a table specifying the databases, schemas, tables and columns accessed by the procedure (P-DSTC). The P-DSTC specifies read, write and execute permissions of procedural code block to access for database elements. The P-DSTC can be stored as a flattened data structure. The access control policies for a procedural code block can be determined in a variety of methods. For example, in one embodiment, the procedure could be cross-referenced against a list of keywords. Keywords could include database elements such as tables, columns, databases, schemas. Database operators, e.g., SQL operators, of the procedural code block can correspond to permissions. For example, a SELECT statement can represent the procedure requiring read access, whereas an UPDATE statement can represent the procedure requiring execute or write permissions. Alternatively, in another embodiment, natural language processing can be used to extract the appropriate permissions of the procedure to the database elements. FIG. 8 shows the example procedure of FIG. 5 has read access to all the columns of the Emp table. The procedure has update access to every column of the Payroll table, except the Salary column, which the procedure is denied read access to.

FIG. 9 is an example data access elements after reconstruction of a procedure. The reconstructed procedure has read access to every column of the Emp table except the social security number column which is masked. The reconstructed procedure also has update access to every column of the Payroll table except the Salary column which the reconstructed procedure is denied read access.

II. Example Mobile and Stationary Device Embodiments

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the present disclosure or of what may be claimed, but rather as descriptions of features that may be specific to particular example embodiments described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

III. Example Embodiments

A computer-implemented method to control access to a database is disclosed herein. The computer-implemented method includes: receiving, by a computer system and from a user, a request to access one or more data elements stored in a distributed database, the request including a procedural language code block (PLCB); obtaining, by the computer system, an access control policy that indicates at least one permission required to access the one or more data elements; determining, by the computer system and based on the access control policy, that access to a restricted portion of the one or more data elements is denied; modifying, by the computer system, the request by reconstructing the PLCB to remove a request to access the restricted portion of the one or more data elements; and submitting, by the computer system, the modified request to the distributed database to receive a second portion of one or more data elements to which the user is permitted to access.

In one implementation of the foregoing method, the obtaining the access control policy comprises: determining one or more database elements specified by the PLCB, each database element of the one or more database elements indicating where a respective requested data element is stored in the distributed database; comparing the one or more database elements with a first data structure that includes general access permissions to all users of the distributed database; and determining that the one or more database elements match a first set of database elements in the first data structure, wherein permissions associated with the first set of database elements stored in the first data structure are obtained as the access control policy.

In another implementation of the foregoing method, the method further includes: determining that the access control policy denies access to at least one data element of the requested one or more data elements; submitting a user identification of the user to a policy engine that stores a plurality of policies associated with users of the distributed database; and receiving, from the policy engine, one or more user access policies, each user access policy of the one or more user access policies being associated with a respective database element of the one or more database elements and indicating user permission to access the respective database element, wherein the request is modified based on the one or more user access policies to remove requests to access data elements of the one or more data elements for which the user do not have permission to access.

In another implementation of the foregoing method, the method further includes: determining a pre-reconstructed procedural language code block (pre-PLCB) associated with the data elements of the one or more data elements for which the user has permission to access, wherein the request is modified by replacing the PLCB with the pre-PLCB.

In another implementation of the foregoing method, the pre-PLCB is a reconstructed PLCB generated in response to a previously submitted data request to the distributed database.

In another implementation of the foregoing method, each database element includes identifications of a database, a schema, a table, and a column of a respective requested data element of the one or more data elements in the distributed database.

In another implementation of the foregoing method, permissions stored in the first data structure are generated based on access permissions provided to data requests previously submitted by one or more users to the distributed database.

In another implementation of the foregoing method, the access control policy comprises a control flow pattern-based access policy, and said modifying, by the computer system, the request by reconstructing the PLCB to remove the request to access the restricted portion of the one or more data elements comprises reconstructing the PLCB based at least on an access pattern stored in the control flow pattern-based access policy.

In another implementation of the foregoing method, the method further includes: identifying the second portion of one or more data elements to which the user is permitted to access in a log comprising a history of accessed data elements.

A system is disclosed herein. The system includes one or more processors; and one or more memory devices that store program code configured to be executed by the one or more processors, the program code comprising: a data processing application configured to receive, from a user, a request to access one or more data elements stored in a distributed database, the request including a procedural language code block (PLCB); a procedural language (PL) code block analyzer configured to obtain an access control policy that indicates at least one permission required to access the one or more data elements; a control system configured to determine, based on the access control policy, that access to a restricted portion of the one or more data elements is denied; and a reconstruction system configured to: modify the request by reconstructing the PLCB to remove a request to access the restricted portion of the one or more data elements; and provide the modified request to the distributed database to receive a second portion of one or more data elements to which the user is permitted to access.

In one implementation of the foregoing system, the PL code block analyzer is configured to: determine one or more database elements specified by the PLCB, each database element of the one or more database elements indicating where a respective requested data element is stored in the distributed database; and the control system is configured to: compare the one or more database elements with a first data structure that includes general access permissions to all users of the distributed database; and determine that the one or more database elements match a first set of database elements in the first data structure, the access control policy identifying permissions associated with the first set of database elements stored in the first data structure.

In another implementation of the foregoing system, the control system is further configured to: determine the access control policy denies access to at least one data element of the requested one or more data elements; and wherein the PL block analyzer is configured to: submit a user identification of the user to a policy engine that stores a plurality of policies associated with users of the distributed database; and receive, from the policy engine, one or more user access policies, each user access policy of the one or more user access policies being associated with a respective database element of the one or more database elements and indicating user permission to access the respective database element, wherein the request is modified based on the one or more user access policies to remove requests to access data elements of the one or more data elements for which the user do not have permission to access.

In another implementation of the foregoing system, the control system is further configured to: determining a previously stored procedural language code block (pre-PLCB) associated with the data elements of the one or more data elements for which the user has permission to access, wherein the request is modified by replacing the PLCB with the pre-PLCB.

In another implementation of the foregoing system, the pre-PLCB is a reconstructed PLCB generated in response to a previously submitted data request to the distributed database.

In another implementation of the foregoing system, each database element includes identifications of a database, a schema, a table, and a column of a respective requested data element of the one or more data elements in the distributed database.

In another implementation of the foregoing system, permissions stored in the first data structure are generated based on access permissions provided to data requests previously submitted by one or more users to the distributed database.

In another implementation of the foregoing system, the access control policy comprises a control flow pattern-based access policy; and the system comprises a pattern-based control system configured to reconstruct the PLCB based at least on an access pattern stored in the control flow pattern-based access policy.

In another implementation of the foregoing system, the system further includes: a log comprising a history of accessed data elements, the log identifying at least the second portion of data elements of the one or more data elements to which the user is permitted to access.

A computer-readable memory is disclosed herein. The computer-readable memory has computer program code recorded thereon that when executed by at least one processor causes the at least one processor to perform a method comprising: receiving, by a computer system and from a user, a request to access one or more data elements stored in a distributed database, the request including a procedural language code block (PLCB); obtaining, by the computer system, an access control policy that indicates at least one permission required to access the one or more data elements; determining, by the computer system and based on the access control policy, that access to a restricted portion of the one or more data elements is denied; modifying, by the computer system, the request by reconstructing the PLCB to remove a request to access the restricted portion of the one or more data elements; and submitting, by the computer system, the modified request to the distributed database to receive a second portion of one or more data elements to which the user is permitted to access.

In one implementation of the foregoing computer-readable memory, the obtaining the access control policy comprises: determining one or more database elements specified by the PLCB, each database element of the one or more database elements indicating where a respective requested data element is stored in the distributed database; comparing the one or more database elements with a first data structure that includes general access permissions to all users of the distributed database; and determining that the one or more database elements match a first set of database elements in the first data structure, wherein permissions associated with the first set of database elements stored in the first data structure are obtained as the access control policy.

IV. Conclusion

While various embodiments of the disclosure have been described above, it should be understood that they have been presented by way of example only, and not limitation. It will be understood by those skilled in the relevant art(s) that various changes in form and details may be made therein without departing from the spirit and scope of the disclosure as defined in the appended claims. Accordingly, the breadth and scope of the disclosure should not be limited by any of the above-described exemplary embodiments, but should be defined only in accordance with the following claims and their equivalents.

What is claimed is:

1. A computer-implemented method to control access to a database, the method comprising:
   receiving, by a computer system and from a user, a request to access one or more data elements stored in a distributed database, the request including a procedural language code block (PLCB);
   obtaining, by the computer system, an access control policy that indicates at least one permission required to access the one or more data elements, the obtaining comprising:
      determining one or more database elements specified by the PLCB, each database element of the one or more database elements indicating where a respective requested data element is stored in the distributed database;
      comparing the one or more database elements with a first data structure that includes general access permissions to all users of the distributed database; and
      determining that the one or more database elements match a first set of database elements in the first data structure,
      wherein permissions associated with the first set of database elements stored in the first data structure are obtained as the access control policy;
   determining, by the computer system and based on the access control policy, that access to a restricted portion of the one or more data elements is denied;
   modifying, by the computer system, the request by reconstructing the PLCB to remove a request to access the restricted portion of the one or more data elements; and
   submitting, by the computer system, the modified request to the distributed database to receive a second portion of one or more data elements to which the user is permitted to access.

2. The method of claim 1, further comprising:
   determining that the access control policy denies access to at least one data element of the requested one or more data elements;
   submitting a user identification of the user to a policy engine that stores a plurality of policies associated with users of the distributed database; and
   receiving, from the policy engine, one or more user access policies, each user access policy of the one or more user access policies being associated with a respective database element of the one or more database elements and indicating user permission to access the respective database element,
   wherein the request is modified based on the one or more user access policies to remove requests to access data elements of the one or more data elements for which the user does not have permission to access.

3. The method of claim 2, further comprising:
   determining a pre-reconstructed procedural language code block (pre-PLCB) associated with the data elements of the one or more data elements for which the user has permission to access,
   wherein the request is modified by replacing the PLCB with the pre-PLCB.

4. The method of claim 3, wherein the pre-PLCB is a reconstructed PLCB generated in response to a previously submitted data request to the distributed database.

5. The method of claim 1, wherein each database element includes identifications of a database, a schema, a table, and a column of a respective requested data element of the one or more data elements in the distributed database.

6. The method of claim 1, wherein permissions stored in the first data structure are generated based on access permissions provided to data requests previously submitted by one or more users to the distributed database.

7. The method of claim 1, wherein the access control policy comprises a control flow pattern-based access policy, and
   wherein said modifying, by the computer system, the request by reconstructing the PLCB to remove the request to access the restricted portion of the one or more data elements comprises reconstructing the PLCB based at least on an access pattern stored in the control flow pattern-based access policy.

8. The method of claim 1, further comprising:
   identifying the second portion of one or more data elements to which the user is permitted to access in a log comprising a history of accessed data elements.

9. A system, comprising:
   one or more processors; and
   one or more memory devices that store program code configured to be executed by the one or more processors, the program code comprising:
      a data processing application configured to receive, from a user, a request to access one or more data elements stored in a distributed database, the request including a procedural language code block (PLCB);
      a procedural language (PL) code block analyzer configured to:
         obtain an access control policy that indicates at least one permission required to access the one or more data elements; and
         determine one or more database elements specified by the PLCB, each database element of the one or more database elements indicating where a respective requested data element is stored in the distributed database;
      a control system configured to:

compare the one or more database elements with a first data structure that includes general access permissions to all users of the distributed database;

determine that the one or more database elements match a first set of database elements in the first data structure, the access control policy identifying permissions associated with the first set of database elements stored in the first data structure; and determine, based on the access control policy, that access to a restricted portion of the one or more data elements is denied; and a reconstruction system configured to:

modify the request by reconstructing the PLCB to remove a request to access the restricted portion of the one or more data elements; and provide the modified request to the distributed database to receive a second portion of one or more data elements to which the user is permitted to access.

10. The system of claim 9, wherein the control system is further configured to:

determine the access control policy denies access to at least one data element of the requested one or more data elements; and wherein the PL block analyzer is configured to:

submit a user identification of the user to a policy engine that stores a plurality of policies associated with users of the distributed database; and receive, from the policy engine, one or more user access policies, each user access policy of the one or more user access policies being associated with a respective database element of the one or more database elements and indicating user permission to access the respective database element, wherein the request is modified based on the one or more user access policies to remove requests to access data elements of the one or more data elements for which the user does not have permission to access.

11. The system of claim 10, wherein the control system is further configured to:

determining a previously stored procedural language code block (pre-PLCB) associated with the data elements of the one or more data elements for which the user has permission to access, wherein the request is modified by replacing the PLCB with the pre-PLCB.

12. The system of claim 11, wherein the pre-PLCB is a reconstructed PLCB generated in response to a previously submitted data request to the distributed database.

13. The system of claim 9, wherein each database element includes identifications of a database, a schema, a table, and a column of a respective requested data element of the one or more data elements in the distributed database.

14. The system of claim 9, wherein permissions stored in the first data structure are generated based on access permissions provided to data requests previously submitted by one or more users to the distributed database.

15. The system of claim 9, wherein the access control policy comprises a control flow pattern-based access policy; and wherein the system comprises a pattern-based control system configured to reconstruct the PLCB based at least on an access pattern stored in the control flow pattern-based access policy.

16. The system of claim 9, further comprising:

a log comprising a history of accessed data elements, the log identifying at least the second portion of data elements of the one or more data elements to which the user is permitted to access.

17. A memory device having computer program code recorded thereon that when executed by at least one processor causes the at least one processor to perform a method comprising:

receiving, by a computer system and from a user, a request to access one or more data elements stored in a distributed database, the request including a procedural language code block (PLCB);

obtaining, by the computer system, an access control policy that indicates at least one permission required to access the one or more data elements;

determining, by the computer system and based on the access control policy, that access to a restricted portion of the one or more data elements is denied;

determining a pre-reconstructed procedural language code block (pre-PLCB) associated with a second portion of one or more data elements to which the user is permitted to access;

modifying, by the computer system, the request by replacing the PLCB with the pre-PLCB, wherein the pre-PLCB removes a request to access the restricted portion of the one or more data elements; and submitting, by the computer system, the modified request to the distributed database to receive a second portion of one or more data elements to which the user is permitted to access.

18. The memory device of claim 17, wherein obtaining the access control policy comprises:

determining one or more database elements specified by the PLCB, each database element of the one or more database elements indicating where a respective requested data element is stored in the distributed database;

comparing the one or more database elements with a first data structure that includes general access permissions to all users of the distributed database; and determining that the one or more database elements match a first set of database elements in the first data structure, wherein permissions associated with the first set of database elements stored in the first data structure are obtained as the access control policy.

19. The memory device of claim 18, wherein permissions stored in the first data structure are generated based on access permissions provided to data requests previously submitted by one or more users to the distributed database.

20. The memory device of claim 17, wherein the pre-PLCB is a reconstructed PLCB generated in response to a previously submitted data request to the distributed database.

* * * * *